May 27, 1952 J. W. WRIGHT 2,598,480
POWER-OPERATED SAW HAVING OPPOSITELY RECIPROCATING SAW BLADES
Filed Dec. 1, 1947 3 Sheets-Sheet 2
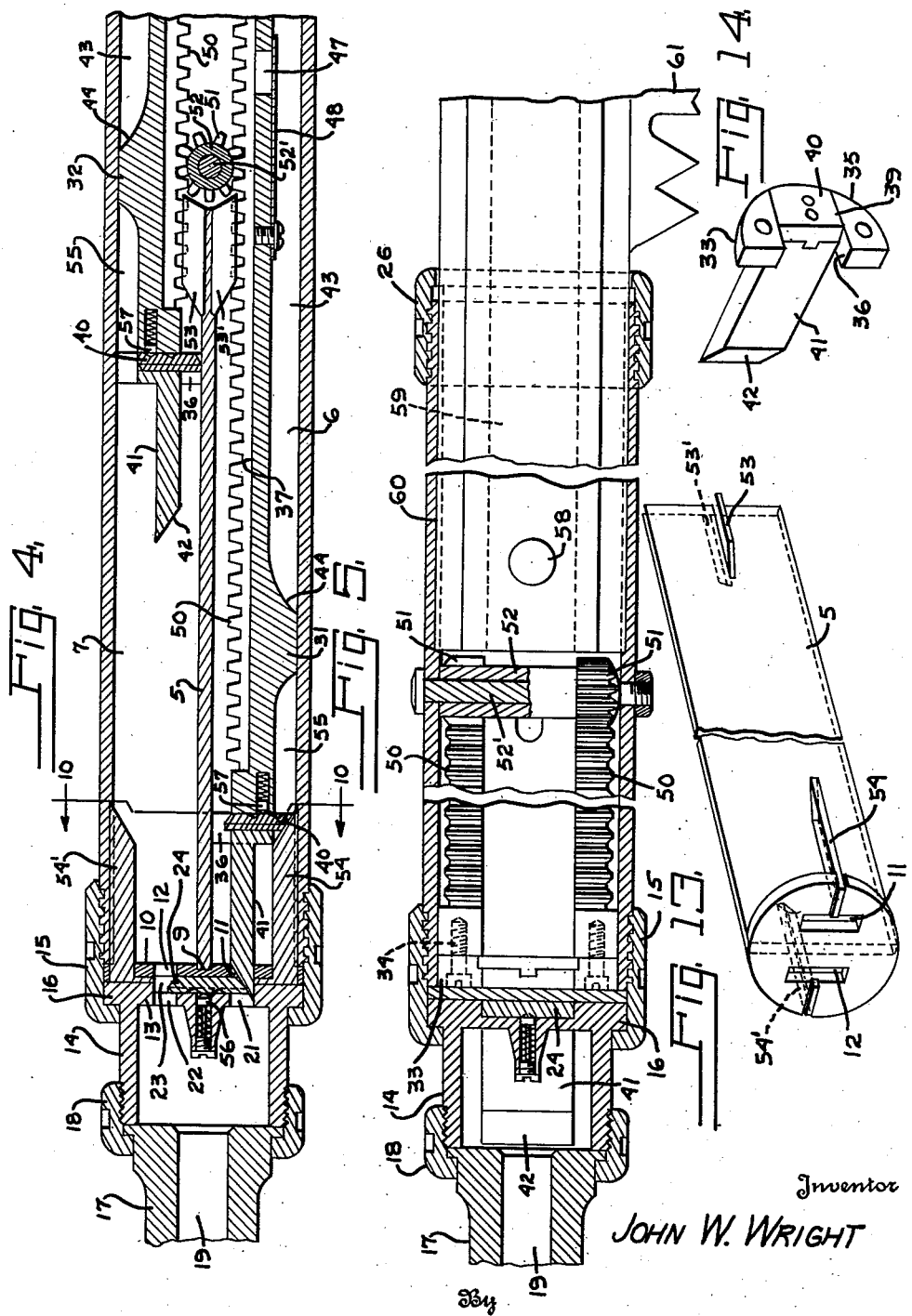
Inventor
JOHN W. WRIGHT
By
Semmes, Keegin, Robinson & Semmes
ATTORNEYS

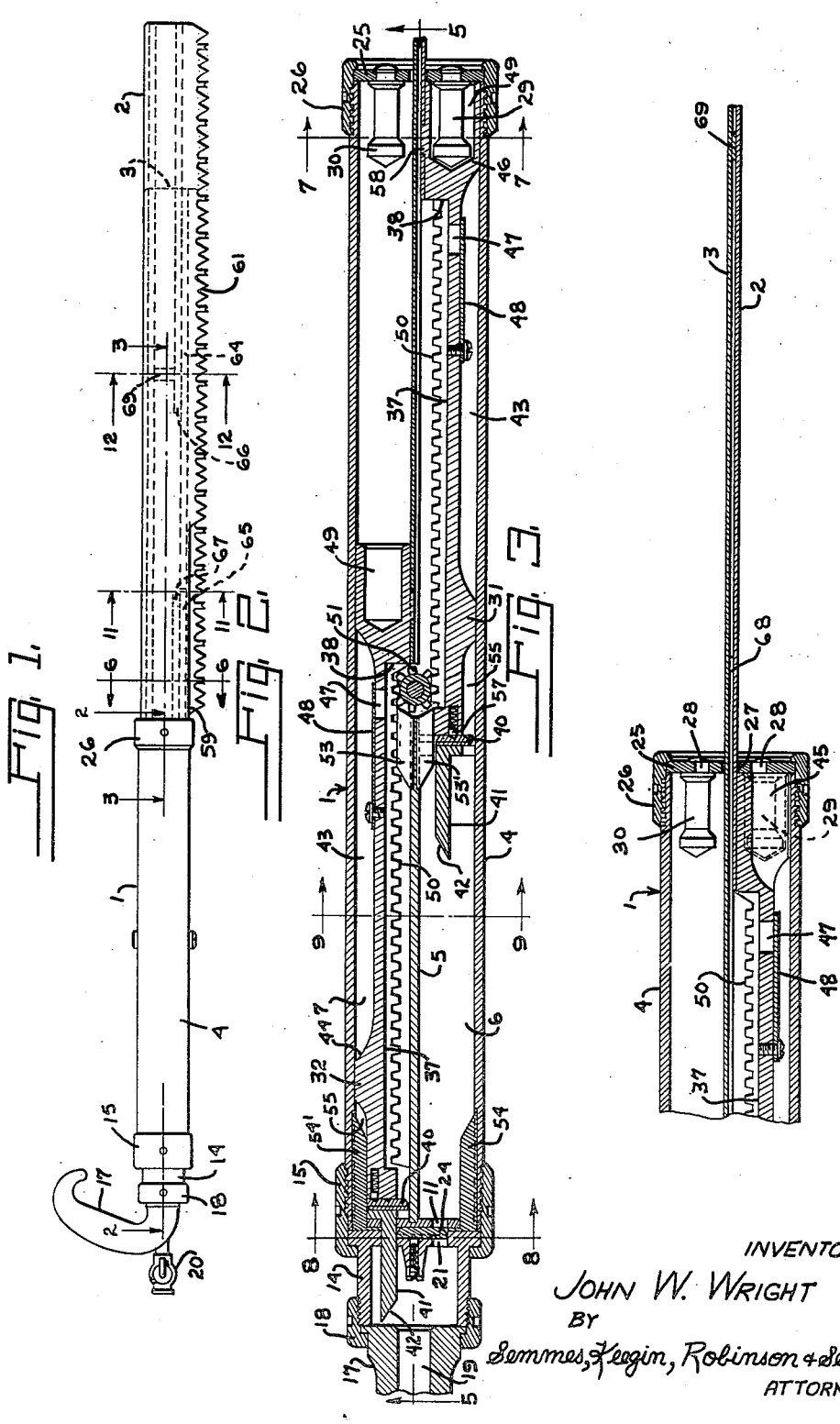

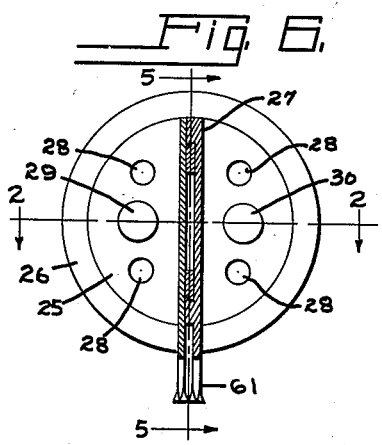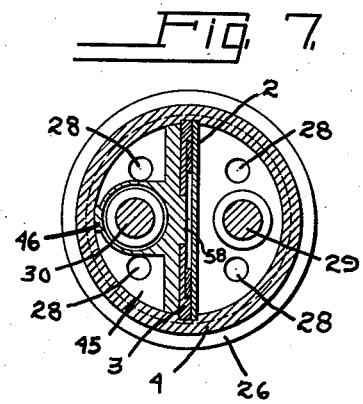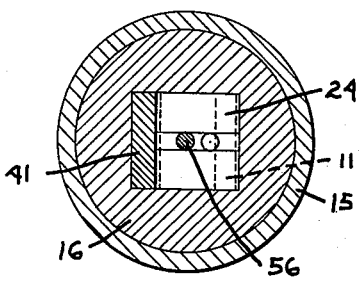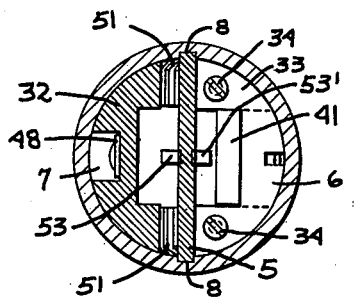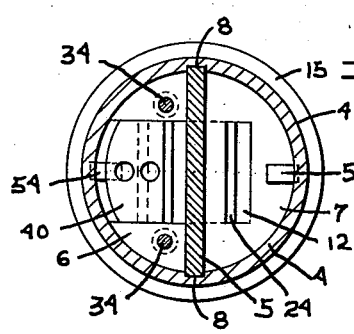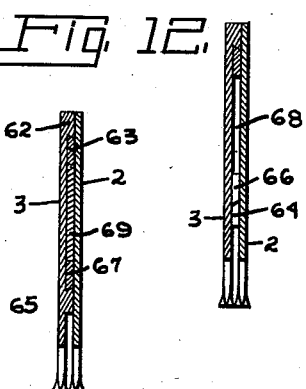

Patented May 27, 1952

2,598,480

UNITED STATES PATENT OFFICE 2,598,480

POWER-OPERATED SAW HAVING OPPOSITELY RECIPROCATING SAW BLADES

John W. Wright, Bridgeport, Conn.

Application December 1, 1947, Serial No. 789,046

19 Claims. (Cl. 143—68)

This invention relates to saws and more particularly to a lightweight, portable, power driven saw of the cross cut type.

More particularly, the invention relates to saw blade structures for use particularly in power operated saw mechanisms, wherein oppositely reciprocating saw blades may be utilized in such fashion that they may be maintained effectively in operating position while being secured together as a unit.

An object of this invention, accordingly, is to provide an oppositely reciprocating saw blade structure wherein juxtaposed saw blades are effectively secured together for opposite reciprocation and in unitary relationship in all transverse planes of the juxtaposed saw blades.

A further object of the invention is to provide a reciprocating saw blade structure of the above type wherein lubricating mechanism is embodied in the mechanism for securing the blades together.

Yet another object of the invention is to provide a reciprocating saw blade structure wherein the blades are maintained in a desired spaced relationship.

A further object of the invention is to provide a reciprocating saw blade structure wherein continuously extending and uninterrupted outer surfaces are formed by the outer surfaces of the juxtaposed saw blades while the securing mechanism engages the adjacent or inner surfaces thereof.

One embodiment of the invention comprises a saw for hand use having a pair of juxtaposed, oppositely reciprocating blades which are splined together for relative longitudinal movement and powered by a pneumatic motor constituting the handle of the saw. The motor is a twin cylinder, single acting, reciprocating type with the saw blades directly connected to the pistons which are semi-cylindrical and operate side by side in semi-cylindrical cylinders in the saw handle and are geared together for synchronized movement. The valve mechanism is self contained and of a sliding type operated by piston movement, the exhaust being utilized to carry lubricant to both the inner and outer faces of the saw blades, and also to blow chips from between the blades.

Among the further objects and advantages of the invention are the elimination of thrust on the handle by the counteraction of opposed thrust of the blades and by dash pot action to retard motion at the ends of the blade strokes; reduction of friction between the blades by directing a portion of the exhaust between the blades; the provision of a simple but efficient air motor and valve mechanism self contained in a single handle; and lightweight but rigid construction throughout capable of easy disassembly and reassembly.

In order to make the invention more clearly understood, a preferred embodiment thereof has been shown in the accompanying drawings and will be described in the following specification. It is to be understood, however, that the embodiment shown and described is by way of illustration only and various changes may be made therein by those skilled in the art, such as in the shape, size and arrangement of the parts, and in the substitution of equivalents, without departing from the spirit of the invention.

In the drawings:

Figure 1 is a view in side elevation of a saw according to this invention;

Figure 2 is a horizontal transverse sectional view taken on the line 2—2 of Figure 1, looking in the direction of the arrows;

Figure 3 is a fragmental horizontal transverse sectional view taken on the line 3—3 of Figure 1, looking in the direction of the arrows;

Figure 4 is a fragmental transverse sectional view similar to Figure 2 but showing the parts in a different position;

Figure 5 is a vertical transverse sectional view partly broken away, taken on the line 5—5 of Figure 2, looking in the direction of the arrows;

Figure 6 is a cross sectional view taken on the line 6—6 of Figure 1, looking in the direction of the arrows;

Figure 7 is a cross sectional view taken on the line 7—7 of Figure 2, looking in the direction of the arrows;

Figure 8 is a cross sectional view taken on the line 8—8 of Figure 2, looking in the direction of the arrows;

Figure 9 is a cross sectional view taken on the line 9—9 of Figure 2, looking in the direction of the arrows;

Figure 10 is a cross sectional view taken on the line 10—10 of Figure 4, looking in the direction of the arrows;

Figure 11 is a cross sectional view taken on the line 11—11 of Figure 1, looking in the direction of the arrows;

Figure 12 is a cross sectional view taken on the line 12—12 of Figure 1, looking in the direction of the arrows;

Figure 13 is a view in perspective of the cylinder dividing plate and head, and

Figure 14 is a view in perspective of one of the piston heads and its associated exhaust valve and valve actuating cam.

Referring more particularly to the drawings, a saw according to this invention may comprise a pneumatic motor, designated generally as 1, which serves as the handle of the saw, and a saw blade assembly comprising a pair of cross cut saw blades 2 and 3 which are powered by the motor for oppositely reciprocating movement.

The motor 1 comprises a cylindrical tube 4 which is divided longitudinally in its rear interior half by a partition plate 5 forming a pair of semi-circular cylinders 6 and 7. As seen in Figures 9 and 10, opposite longitudinal edges of the plate 5 are set in diametrically opposed grooves 8 in the inner wall of the tube 4, while the rear end of the plate is securely set in a diametric groove 9 (see Figure 4) in a head disc 10 which is formed with a pair of rectangular inlet valve ports 11 and 12 respectively communicating with the cylinders 6 and 7. The head disc 10 is clamped between the end of the cylinder 4 and the head end or wall 13 of a cylindrical valve chest element or manifold 14 by means of an internally flanged annular cap 15 screw-threaded on the end of the cylinder tube 4 and engaging an external peripheral flange 16 on the chest element 14. The rear end of the valve chest element is connected with an offset handle 17 by means of an internally flanged, annular screw cap 18. The handle 17 has an air passage 19 therein communicating with the interior of the valve chest and connected with a valved fitting 20 adapted for connection through a flexible hose line (not shown) with a source of compressed air. The head end 13 of the valve chest is formed with a pair of rectangular valve ports 21 and 22 which register respectively with the ports 11 and 12 and between which extends a slide valve recess 23. Positioned in the recess 23 for sliding movement therein is a valve element 24 adapted to alternately open and close the ports 11 and 12 in a manner to be described.

The opposite or blade end of the cylinder tube 4 is closed by a disc 25 clamped against the end of the tube by an internally flanged annular cap 26 screw-threaded on the end of the tube. The disc 25 is formed with a diametric slot 27, through which the saws 2 and 3 move, and a plurality of exhaust ports 28 on opposite sides of slot 27 are directed forwardly respectively toward the outer faces of the blades 2 and 3. In addition, the disc 25 has rigidly secured thereto a pair of plunger members 29 and 30 which project inside the tube 4 parallel with the axis thereof and constitute a part of a dash pot system to be more fully described.

Mounted to reciprocate in the cylinder tube 4, on opposite sides of the dividing wall 5, are a pair of pistons designated generally as 31 and 32. These pistons are identical and only one will be described, corresponding reference numerals designating corresponding elements of both pistons.

Each piston is generally semi-circular in cross section for sliding fit in the cylinders 6 and 7 and has secured thereto, a head member 33 such as by means of cap screws 34. The piston head 33 is best seen in Figure 14 and comprises a semicircular plate 35 having a rectangular notch cut in its flat edge and forming an exhaust valve port 36 which communicates with a longitudinal main exhaust passage 37 formed in the flat side of the piston and extending substantially the length thereof to a closed end 38. Extending across the inner face of the plate 35 from the port 36 is a rectangular groove 39 in which is positioned, for sliding movement, a valve element 40 adapted to open and close the port 36. Integrally formed on the plate 33 and extending perpendicularly from its outer face is an intake valve actuating cam 41 having an inclined working face 42. The cams 41 are axially aligned respectively with the intake ports 11 and 21 and 12 and 22, and move therethrough when the pistons move to the head ends of their strokes, the inclined faces 42 having a wedging action on the valve element 24 to move it to close the opposite intake port.

In the cylindrical face of the pistons there is formed a secondary exhaust passage 43 which extends longitudinally from a closed end 44 near the head end of the piston to adjacent the opposite end where it communicates with a pair of short passageways 45 opening in the end of the piston and separated by a central rib 46. The passage 43 communicates with the main passage 37 through a port 47 which is closed normally by an outwardly opening flap valve 48 consisting of a leaf of spring metal lying in the passage 43 and secured at one end to the piston. The flexibility of the flap is calculated to open the port 47 at a predetermined maximum pressure in the passage 37. The rib 46 is bored axially from the end of the piston to form a socket 49. These sockets are in axial alignment with the plungers 29 and 30 to receive the plungers in the extended positions of the pistons and constitute the cylinder portions of the dash pots mentioned above.

The opposed longitudinal flat faces of the pistons 31 and 32, on opposite sides of the exhaust passage 37, between the ends of the pistons, are milled to form double rows of opposed rack teeth 50 which respectively mesh with a pair of pinions 51 on opposite ends of a shank 52 rotatably mounted in the cylinder 4 substantially intermediate its ends on a stationary pin 52' extending diametrically through the tube 4. By means of this geared connection, it will be seen that motion of one of the pistons will be transmitted to the other to move the latter in an opposite direction.

As noted above, the head of each piston is provided with its own exhaust valve including the sliding valve element 40. These valve elements are actuated during piston movement in directions to open the exhaust ports 36 by a pair of inclined cams 53 and 53' secured to opposite sides of the cylinder dividing plate 5 adjacent its free end, and by means of a pair of diametrically opposed, inclined cam elements 54 and 54' secured to the head 13 and extending inside the cylinders adjacent the cylinder walls. The cam elements 54 and 54' ride into and fit substantially closely in grooves 55 formed in the head ends of the pistons and serve therewith as additional dash pots. The intake valve element 24 and exhaust valve elements 40 are each maintained in their open and closed position against accidental displacement by small detent devices, the detent for the intake valve comprising a spring loaded plunger 56 carried by the valve chest head 13 and selectively seating in a pair of sockets in the valve element 24, and the exhaust valve detent comprising a similar spring loaded plunger 57 carried by the piston and selectively seating in a pair of sockets in the valve element 40.

The flat longitudinal faces of the pistons, near their outer ends, are respectively provided with a short, central lug 58 which are engaged respectively in a corresponding aperture in the inner end of the saw blades 2 and 3. The blades are splined together, as will be described, in face to face juxtaposition for relative longitudinal movement and each comprises a shank portion 59 moving through the slot 27 in the head disc and in diametrically opposed longitudinal grooves 60 formed in the interior wall of the cylinder tube 4, and a toothed portion 61 formed preferably with cross cut teeth of conventional design.

Splining the blades 2 and 3 together is a rib 62 which is secured to the inner face of the blade 3, such as by electric welding, and extends the length of the blade at the back edge. The rib 62 has its lower edge inclined inwardly to mate with a similarly inclined upper edge of a rib 63 which is secured to the inner face of the blade 2 and extends also the length of the blade. Similarly secured to the blade 3 at the lower edge of the shank portion 59 parallel with the rib 62 are a pair of longitudinally aligned ribs 64 and 65 which extend forwardly and rearwardly respectively from the shank end and free end of the blade and have their inner ends spaced apart a distance substantially equal to the length of stroke of the piston 32. The ribs 64 and 65 have their upper edges inclined inwardly and mate respectively with oppositely formed ribs 66 and 67 secured to the inner face of the blade 2. The ribs 66 and 67 likewise extend respectively from the shank end and the free end of the blade 2 and also have their inner ends spaced apart a distance substantially equal to the stroke of the piston 31.

From the above it will be seen that the ribs 62, 64 and 65 form a dovetail way on the inner face of the blade 3 while the ribs 63, 66 and 67 form a dovetail key which slides in this way and splines the two blades together. It will be seen further that the spacing between the longitudinal inner edges of the rib 63 and the ribs 66 and 67, and the spacing between the ends of the ribs 66 and 67 and the ribs 64 and 65 forms a channel 68 between the blades which opens at its inner end within the cylinder 9 in communication with the exhaust passage 37 in the pistons, and at its outer end between the teeth of the saw. The forward portion of the channel 68 outwardly beyond the opening between the blades preferably is blocked, such as by a transverse strip 69 secured to the inner face of the blade 2 between the ribs 63 and 67. The thickness of the ribs preferably is such as to space the blades just sufficiently far apart so that the inwardly set teeth of the adjacent blades will just clear each other, as shown in Figures 11 and 12, and the blade assembly will cut a single kerf.

Inasmuch as the spline connection between the blades extends continuously between the juxtaposed portion of the blades, the latter are effectively maintained in operative relationship in all transverse planes, thus insuring an effective unitary structural relationship of the oppositely reciprocating saw blades during operation. This is accomplished by the plurality of longitudinally extending spline surfaces forming interengaging bearing surfaces which are secured in such relationship, respectively, by each other. Moreover, this structure insures that a desired spaced relationship may be maintained between the blades at all times.

The foregoing structure forming the channel 68 thus provides an effective means by which a lubricant may be supplied or maintained between the spaced saw blades and additionally provides, if desired, means whereby a fluid pressure may be maintained between the blades to relieve the adjacent surfaces of at least a portion of the pressure that might otherwise exist at the wearing surfaces.

In addition to the foregoing, the structure above described provides continuously extending and uninterrupted outer surfaces for the saw, while the inner surfaces of the blades carry the securing mechanism.

In operation, the saw is held by the operator with one hand grasping the handle 17 and the other hand grasping the cylinder tube 4. Air under a desired operating pressure, for example 50-p. s. i., is admitted to the valve chest 14 by opening the valve 20. This operating air may be supplied by a suitable compressor or other source of supply not shown and connected with an oil supply to aspirate a lubricating oil mist into the incoming air.

Assuming that the pistons 31 and 32 are in the positions shown in Figure 2 with the piston 32 in its extreme inward position and the piston 31 in its extreme outward position, the cam 41 on the piston 32 will have moved the intake valve element 24 to close the intake port 11 and open the intake port 12, while the cam 54' will have moved the exhaust valve element in the piston 32 to close its associated exhaust port 36 and the cam 53' will have moved the valve element 40 in the piston 31 to open its associated exhaust port 36. Thus the cylinder 7 is in open communication with the compressed air supply and the cylinder 6 is in open communication with the exhaust passage 37 in the piston 31.

Compressed air in the valve chest 14 acts first on the cross sectional area of the cam member 41 until the cam 41 clears the port 12, and then on the head of the piston to move the piston 32 and blade 3 in a forward direction. The forward movement of the piston 32 is transmitted to the piston 31 through the rack teeth 50 and pinions 51 to move the piston 31 and blade 2 in an opposite or rearward direction. As the piston 31 approaches the end of its rearward stroke (as shown in Figure 4) the cam 41 on the piston 31 moves into the intake valve port 11 thereby moving the valve element 24 to open the port 11 and close the port 12. Simultaneously therewith the cam member 54 engages the exhaust valve element 40 on the piston 31 to close its exhaust port 36. The cross sectional area of the cam member 41 is relatively small and momentum carries the pistons in the above named directions until the cam member 54 engages the valve element 40 on the piston 32 to close its associated exhaust port 36. During this latter part of the piston stroke the cam 54 moves into the groove 55 in the piston 31 and the plunger 30 moves into the socket 49 in the end of the piston 32, compressing the air therein to retard piston motion and absorb shock. Compression of the air in the groove 55 and socket 49 also serves to reverse the piston movement and start the next cycle.

During the above stroke, as the piston 31 moves rearwardly, air in the cylinder 6 is exhausted through the port 36 in the piston 31 into its main exhaust passage 37 thence through the channel 68 between the saw blades and out through the space between the ribs and past the saw teeth and into the kerf being cut blowing chips and dust from between the blades and out of the kerf. As pressure builds up in the cylinder due to the relatively small cross sectional area of the channel 68, the closing force of the flap valve 48 will be overcome and air in excess of the pressure force of this valve will pass through the port 47 and into the passage 43 from which it flows through the passages 45 and out through the ports 28 in the head 25. These ports may be directed toward the outer faces of the saw blades.

A substantial pressure will be exerted in the channel 68 outwardly against the inner walls of the saw blades urging the blades apart so that in effect the bearing surfaces will be confined substantially to the interengaged angular edges of the splining ribs thus greatly reducing friction.

As stated above, oil is admitted with the operating air in the form of a mist or spray. This oil not only lubricates the motor but being exhausted with the exhaust air between the blades and directed against the outer faces of the blades also keeps the blades lubricated.

The space between the facing ends of the lower ribs is always in the mean center of the blade assembly, or in the center of the cut being made so that the exhaust air directed downwardly through this space blows dust and chips forwardly and rearwardly from the saw kerf. This space varies in length from zero to the length of the piston stroke depending upon the relative positions of the blades so that even at low operating pressures at least a portion of the exhaust air will be blown through the valve ports 47.

When the piston 31 reaches the head end of its stroke, as set forth above, air from the valve chest will be admitted through the intake valve 11 and the above described cycle repeated, the air forcing the piston 31 forwardly which motion is transmitted to a rearward motion of the piston 32 through the racks 50 and pinions 51. Thus, the force exerted alternately on the pistons 31 and 32 is transmitted alternately through the racks and pinions to the other pistons and the thrust of the pistons transmitted directly to equivalent straight line thrust of the saw blades to provide cutting forces simultaneously in opposite directions and no thrust, except a slight thrust possibly felt at the reversal of the piston strokes, is transmitted to the handle. The dash pot action at the ends of the piston strokes serves to retard the piston momentum and absorb a good part of the reversing thrust. Further the cushioning pressure built up in the dash pot cylinders exerts a substantial opposite thrust on the pistons tending to reverse their motion providing a smooth operating motor and substantially reducing tooth pressure on the rack and pinion gears.

By means of the inter-splining of the saw blades, one blade reinforces the other and a substantially stiff blade assembly is provided. The construction provides for the use of saw steel of standard thickness and the whole assembly cuts a substantially narrow single kerf. The method of attaching the blades to the pistons and the construction of the motor itself permits easy removal of the blades for sharpening or replacement which is accomplished simply by removing the front cap 26 and pinion stud 52' when the blades and pistons can be pulled out far enough to remove the blade from its stud.

While the structure herein described is particularly adaptable to saws, it is obvious that it could be employed in the operation of other units using twin reciprocating tools, such as files, scrapers, brushes, shears and the like.

I claim:

1. A saw of the class described comprising a motor constituting the handle of the saw and having a pair of parallel juxtaposed cylinders of substantially semi-circular cross section, a piston mounted for reciprocation in each cylinder, a pair of saw blades in juxtaposed face relation, each saw blade having an operating connection with a corresponding piston, means supplying operating fluid under pressure alternately to each cylinder, means for exhausting said fluid from the other cylinder, rib means secured respectively to the juxtaposed faces of the saw blades and extending longitudinally thereof, and rib means of one blade engaging rib means of the other blade splining said blades together, the said exhaust means including a channel defined by said rib means and blade faces for exhausting fluid between said blades.

2. In a saw of the class described including a pair of blades in face to face juxtaposition, fluid operated motor means operatively connected with the blades for reciprocating the same simultaneously in opposite directions and means for supplying operating fluid to the motor means and exhausting the same therefrom, cooperating parallel rib means respectively on the juxtaposed faces of the blades extending longitudinally adjacent the back edges thereof, other cooperating parallel rib means on said faces parallel with the first rib means and in spaced relation thereto adjacent the tooth edges of the blades, said last named rib means extending respectively from opposite ends of said tooth edge with their adjacent ends in longitudinally spaced relation to each other and forming a gap between said adjacent ends communicating with the space between the first named and second named rib means, said rib means forming splines connecting the blades together, and the space between said blade faces and the first rib means and second rib means and said gap constituting a channel forming a part of said exhaust means for directing exhaust fluid longitudinally between said blade faces and then outwardly between the tooth edges.

3. A saw of the class described comprising a motor constituting the handle of the saw and having a pair of parallel juxtaposed cylinders of substantially semi-circular cross section, a piston mounted for reciprocation in each cylinder, a pair of saw blades in juxtaposed face relation, one saw blade having an operating connection with each piston, means supplying operating fluid under pressure alternately to each cylinder, means for exhausting said fluid from the other cylinder, said exhaust means including a primary exhaust passage and a secondary exhaust passage, port means interconnecting said passages, said port means having a relief valve normally closing the same and operated by a predetermined maximum pressure in the primary passage to pass exhaust fluid in excess of said pressure into the secondary passage, parallel rib means respectively on the juxtaposed faces of said blades and extending longitudinally thereof, rib means on one blade engaging rib means on the other blade splining the blades together, certain of said rib means being spaced from other rib means and forming a channel between the blades and communicating with said primary exhaust passage for directing exhaust fluid from the main passage between the blades, and port means communicating with the secondary passage and directed toward the outer faces of the blades for directing the exhaust fluid from the secondary passage against the outer faces of the blades.

4. Saw mechanism comprising two saw blades, means on one face of one of the blades forming a longitudinally extending bearing surface lying in a plane at an angle to a plane extending longitudinally of and at right angles to the plane of the blade, means formed on one of the faces of the other of the blades forming a longitudinally extending bearing surface positioned complementarily to the first bearing surface whereby said two bearing surfaces are adapted to coact, coacting means on the adjacent surfaces of the blades and spaced from the first named coacting bearing surfaces and forming on said blades longitudinally extending bearing surfaces to maintain the first named bearing surfaces in engagement, whereby the two blades are maintained in continually coacting unitary relationship, and means to reciprocate the respective blades in opposite directions simultaneously.

5. Saw mechanism comprising two saw blades, means on one face of one of the blades forming a longitudinally extending bearing surface lying in a plane at an angle to a plane extending longitudinally of and at right angles to the plane of the blade, means formed on one of the faces of the other of the blades forming a longitudinally extending bearing surface positioned complementarily to the first bearing surface whereby said two bearing surfaces are adapted to coact to maintain the portion of the blades adjacent the teeth in spaced relationship, coacting means between the blades coacting with the first mentioned bearing surfaces to maintain the blades in juxtaposed position, whereby the two blades are maintained in continually coacting unitary spaced relationship, and means to reciprocate the respective blades in opposite directions simultaneously.

6. Saw mechanism comprising two saw blades, means on one face of one of the blades forming a longitudinal bearing surface lying in a plane at an angle to a plane at right angles to the plane of the blade, means formed on one of the faces of the other of the blades forming a longitudinally extending bearing positioned complementarily to the first bearing surface whereby said two bearing surfaces are adapted to coact, coacting means on the adjacent surfaces of the blades and spaced from the first named coacting bearing surfaces and forming on said blades longitudinally extending bearing surfaces in spaced relationship to the first named bearing surface to maintain the first named bearing surfaces in engagement and form a longitudinally extending channel between the blades, and means to reciprocate the respective blades in opposite directions simultaneously.

7. Saw mechanism comprising two saw blades each formed with continuously extending and uninterrupted outer surfaces, means on the inner face of one of the blades forming a longitudinally extending bearing surface lying in a plane extending longitudinally of the blade and at an angle to a line at right angles to the blade, means formed on the inner surface of the other of the blades and forming a longitudinal bearing surface positioned complementarily to the first bearing surface whereby said two bearing surfaces are adapted to coact, coacting means on the inner surface of the blades coacting with the first mentioned bearing surfaces and spaced therefrom to maintain the blades in juxtaposed position, whereby the two blades are maintained in continually coacting unitary relationship, and means to reciprocate the respective blades in opposite directions simultaneously.

8. A saw of the class described comprising a motor constituting the handle of the saw and being formed with a pair of parallel juxtaposed cylinders of substantially semicircular cross section, pistons slidably mounted in the respective cylinders, each formed of semicircular cross section with their flat surfaces juxtaposed, a saw blade connected to each piston, power transmitting means on the adjacent sides of the piston, means between the adjacent sides of the pistons and engaging the power transmitting means to transmit motion of one of the blades in one direction to motion of the other of the blades in the opposite direction, and means for supplying an operating fluid under pressure to the cylinders.

9. A saw of the class described comprising a motor constituting the handle of the saw and being formed with a pair of parallel juxtaposed cylinders of substantially semicircular cross section, an elongated piston slidably mounted in each cylinder and formed of semicircular cross section, opposed racks formed on the pistons, a pinion journalled on a fixed axis in the motor and engaged by the opposed racks, means to secure saw blades to the pistons, and means for supplying an operating fluid under pressure alternately to the cylinders.

10. A saw of the class described comprising a motor constituting the handle of the saw and being formed with a pair of parallel juxtaposed cylinders of substantially semicircular cross section, a piston slidably mounted in each cylinder and formed of semicircular cross section, means to secure saw blades to the pistons, power transmitting means on the adjacent sides of the pistons, means between the adjacent sides of the pistons and engaging the power transmitting means to transmit motion of one of the blades in one direction to motion of the other of the blades in the opposite direction, means for supplying an operating fluid under pressure to the cylinders, and means adjacent at least one end of the handle to cushion motion of a piston approaching such end.

11. A saw of the class described comprising a motor constituting the handle of the saw and being formed with a pair of parallel juxtaposed cylinders of substantially semicircular cross section, a piston slidably mounted in each cylinder and formed of semicircular cross section, means to secure saw blades to the pistons, power transmitting means on the adjacent sides of the pistons, means between the adjacent sides of the pistons and engaging the power transmitting means to transmit motion of one of the blades in one direction to motion of the other of the blades in the opposite direction, means for supplying an operating fluid under pressure to the cylinders, and means adjacent the ends of the handle to cushion motion of the pistons as they approach such ends.

12. A saw of the class described comprising a motor constituting the handle of the saw and being formed with a pair of parallel juxtaposed cylinders of substantially semicircular cross section, a piston slidably mounted in each cylinder and formed of semicircular cross section, means to secure saw blades to the pistons, power transmitting means on the adjacent sides of the pistons, means between the adjacent sides of the pistons and engaging the power transmitting means to transmit motion of one of the blades in one direction to motion of the other of the blades in the opposite direction, means for supplying an operating fluid under pressure to the cylinders, and fluid confining means to cushion motion of the pistons as they approach such ends.

13. A saw of the class described comprising a motor constituting the handle of the saw and being formed with a pair of parallel juxtaposed cylinders of substantially semicircular cross section, a piston slidably mounted in each cylinder and formed of semicircular cross section, means to secure saw blades to the pistons, power transmitting means on the adjacent sides of the pistons, means between the adjacent sides of the pistons and engaging the power transmitting means to transmit motion of one of the blades in one direction to motion of the other of the blades in the opposite direction, a fluid pressure manifold at one end of the handle, a cylinder end wall having ports therein communicating between the manifold and the respective cylinders, a unitary movable valve member on the end wall to control the opening and closing of the ports, and means actuated by the pistons to operate the valve member.

14. A saw of the class described comprising a motor constituting the handle of the saw and being formed with a pair of parallel juxtaposed cylinders of substantially semicircular cross section, a piston slidably mounted in each cylinder and formed of semicircular cross section, means to secure saw blades to the pistons, power transmitting means on the adjacent sides of the pistons, means between the adjacent sides of the pistons and engaging the power transmitting means to transmit motion of one of the blades in one direction to motion of the other of the blades in the opposite direction, a fluid pressure manifold at one end of the handle, a cylinder end wall having ports therein communicating between the manifold and the respective cylinders, a valve plate slidable on the end wall to control the opening and closing of the ports, and means actuated by the pistons to operate the valve member.

15. A saw of the class described comprising a motor constituting the handle of the saw and being formed with a pair of parallel juxtaposed cylinders of substantially semicircular cross section, a piston slidably mounted in each cylinder and formed of semicircular cross section, means to secure saw blades to the pistons, power transmitting means on the adjacent sides of the pistons, means between the adjacent sides of the pistons and engaging the power transmitting means to transmit motion of one of the blades in one direction to motion of the other of the blades in the opposite direction, a fluid pressure manifold at one end of the handle, a cylinder end wall having ports therein communicating between the manifold and the respective cylinders, a valve plate slidable on the end wall from one position to another to control the opening and closing of the ports, actuating surfaces on the valve plate, and cams on the pistons to engage the actuating surfaces to actuate the valve plate.

16. A saw of the class described comprising a motor constituting the handle of the saw and being formed with a pair of parallel juxtaposed cylinders of substantially semicircular cross section, a piston slidably mounted in each cylinder and formed of semi-circular cross section, means to secure saw blades to the pistons, power transmitting means on the adjacent sides of the pistons, means between the adjacent sides of the pistons and engaging the power transmitting means to transmit motion of one of the blades in one direction to motion of the other of the blades in the opposite direction, a fluid pressure manifold at one end of the handle, a cylinder end wall having ports therein communicating between the manifold and the respective cylinders, a valve plate slidable on the end wall from one position to another to control the opening and closing of the ports, actuating surfaces on the valve plate, cams on the pistons to engage the actuating surfaces to actuate the valve plate, and means to hold the valve plate yieldingly in either of its two positions.

17. A saw of the class described comprising a motor constituting the handle of the saw and being formed with a pair of parallel juxtaposed cylinders of substantially semicircular cross section, a piston slidably mounted in each cylinder and formed of semi-circular cross section, means to secure saw blades to the pistons, power transmitting means on the adjacent sides of the pistons, means between the adjacent sides of the pistons and engaging the power transmitting means to transmit motion of one of the blades in one direction to motion of the other of the blades in the opposite direction, a fluid pressure manifold at one end of the handle, means to subject the pistons to fluid pressure from such manifold, a discharge port on each piston, a valve member on each piston movable to and from positions to open and close such respective ports, and means in the cylinders to actuate the respective last named valve members.

18. A saw of the class described comprising a motor constituting the handle of the saw and being formed with a pair of parallel juxtaposed cylinders of substantially semicircular cross section, a piston slidably mounted in each cylinder and formed of semi-circular cross section, means to secure saw blades to the pistons, power transmitting means on the adjacent sides of the pistons, means between the adjacent sides of the pistons and engaging the power transmitting means to transmit motion of one of the blades in one direction to motion of the other of the blades in the opposite direction, a fluid pressure manifold at one end of the handle, means to subject the pistons to fluid pressure from such manifold, a discharge port on each piston, a slidable valve member on each piston movable to and from positions to open and close such respective ports, and cams in the cylinders to actuate the respective valve members.

19. A saw of the class described comprising a motor constituting the handle of the saw and being formed with a pair of parallel juxtaposed cylinders of substantially semicircular cross section, a piston slidably mounted in each cylinder and formed of semi-circular cross section, means to secure saw blades to the pistons, power transmitting means on the adjacent sides of the pistons, means between the adjacent sides of the pistons and engaging the power transmitting means to transmit motion of one of the blades in one direction to motion of the other of the blades in the opposite direction, a fluid pressure manifold at one end of the handle, means to subject the pistons to fluid pressure from such manifold, a discharge port on each piston, a slidable valve member on each piston movable to and from positions to open and close such respective ports, cams in the cylinders to actuate the respective valve members, and means to hold the valve plates yieldingly in either open or closed positions.

JOHN W. WRIGHT.

REFERENCES CITED

The following references are of record in the file of this patent:

UNITED STATES PATENTS

| Number | Name | Date |
| --- | --- | --- |
| 531,792 | Forslund et al. | Jan. 1, 1895 |
| 1,215,431 | Tompkins | Feb. 13, 1917 |
| 1,385,289 | Ward | July 19, 1921 |
| 1,491,134 | De Northall | Apr. 22, 1924 |
| 1,537,980 | Asselin | May 19, 1925 |
| 1,726,863 | Singer | Sept. 3, 1929 |

FOREIGN PATENTS

| Number | Country | Date |
| --- | --- | --- |
| 276,546 | Great Britain | of 1927 |